United States Patent
Zawisza

(10) Patent No.: US 8,016,906 B2
(45) Date of Patent: Sep. 13, 2011

(54) HONEYCOMB FILTER ELEMENTS

(75) Inventor: Jeffery D. Zawisza, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 363 days.

(21) Appl. No.: 12/114,045

(22) Filed: May 2, 2008

(65) Prior Publication Data

US 2008/0271422 A1   Nov. 6, 2008

Related U.S. Application Data

(60) Provisional application No. 60/927,653, filed on May 4, 2007.

(51) Int. Cl.
*B01D 46/00* (2006.01)
(52) U.S. Cl. .................... 55/523; 55/DIG. 30
(58) Field of Classification Search ............ 55/522–524; 422/168–172, 177–182; 60/297
See application file for complete search history.

(56) References Cited

U.S. PATENT DOCUMENTS

| | | | |
|---|---|---|---|
| 3,899,326 A | 8/1975 | Frost et al. | |
| 3,903,341 A * | 9/1975 | Gerhold | 428/116 |
| 4,001,028 A | 1/1977 | Frost et al. | |
| 4,162,285 A | 7/1979 | Tanabashi | |
| 4,304,585 A | 12/1981 | Oda et al. | |
| 4,329,162 A | 5/1982 | Pitcher | |
| 4,333,518 A | 6/1982 | Frost et al. | |
| 4,381,815 A | 5/1983 | Frost et al. | |
| 4,741,792 A | 5/1988 | Matsuhisa et al. | |
| 4,786,542 A | 11/1988 | Yasuda et al. | |
| 4,828,807 A | 5/1989 | Domesle et al. | |
| 4,837,943 A | 6/1989 | Mizutani | |
| 4,902,314 A | 2/1990 | Mizukami et al. | |
| 4,953,627 A | 9/1990 | Ito et al. | |
| 5,094,073 A * | 3/1992 | Worner et al. | 60/299 |
| 5,098,455 A | 3/1992 | Doty et al. | |
| 5,173,349 A | 12/1992 | Yavuz | |
| 5,194,154 A | 3/1993 | Moyer et al. | |
| 5,198,007 A | 3/1993 | Moyer et al. | |
| 5,340,516 A | 8/1994 | Yavuz et al. | |
| 5,538,681 A | 7/1996 | Wu | |
| 5,914,187 A | 6/1999 | Naruse et al. | |
| 6,306,335 B1 | 10/2001 | Wallin et al. | |
| 6,582,796 B1 | 6/2003 | Joulin et al. | |
| 6,596,665 B2 | 7/2003 | Wallin et al. | |
| 6,656,564 B2 * | 12/2003 | Ichikawa et al. | 428/116 |
| 6,669,751 B1 | 12/2003 | Ohno et al. | |
| 6,764,743 B2 * | 7/2004 | Kato et al. | 428/118 |
| 6,803,087 B2 * | 10/2004 | Brew et al. | 428/116 |
| 6,890,616 B2 * | 5/2005 | Suwabe et al. | 428/117 |
| 6,984,253 B2 | 1/2006 | Ichikawa et al. | |
| 7,056,568 B2 | 6/2006 | Ichikawa et al. | |

(Continued)

FOREIGN PATENT DOCUMENTS

EP   0042301 B1   12/1981

(Continued)

*Primary Examiner* — Duane Smith
*Assistant Examiner* — Amber Orlando

(57) ABSTRACT

An improved ceramic honeycomb filter wherein the ceramic honeycomb filter has at least one outer corner having a shape, when viewed looking down the channels of the honeycomb, that is comprised of (i) at least two circular arcs wherein at least one of said circular arcs has a different radius of curvature than the other circular arc or arcs, (ii) a non-circular arc, or (iii) at least four straight chamfers in the absence of any arcs.

18 Claims, 3 Drawing Sheets

U.S. PATENT DOCUMENTS

| | | | |
|---|---|---|---|
| 7,112,233 B2 | 9/2006 | Ohno et al. | |
| 7,658,779 B2 * | 2/2010 | Carranza et al. | 55/523 |
| 7,662,204 B2 * | 2/2010 | Forster et al. | 55/523 |
| 2001/0038810 A1 | 11/2001 | Wallin et al. | |
| 2002/0197193 A1 | 12/2002 | Harada et al. | |
| 2004/0020359 A1 | 2/2004 | Koermer et al. | |
| 2004/0055265 A1 * | 3/2004 | Ohno et al. | 55/523 |
| 2004/0128991 A1 * | 7/2004 | Sakamoto | 60/299 |
| 2004/0206044 A1 | 10/2004 | Kondo et al. | |
| 2005/0011174 A1 * | 1/2005 | Hong et al. | 55/523 |
| 2005/0016140 A1 * | 1/2005 | Komori et al. | 55/523 |
| 2005/0016141 A1 * | 1/2005 | Hong et al. | 55/523 |
| 2005/0025933 A1 * | 2/2005 | Masukawa et al. | 428/116 |
| 2005/0095179 A1 * | 5/2005 | Kasai et al. | 422/177 |
| 2005/0129590 A1 * | 6/2005 | Ichikawa | 422/180 |
| 2005/0161849 A1 * | 7/2005 | Ohno et al. | 264/43 |
| 2005/0180898 A1 * | 8/2005 | Yamada | 422/180 |
| 2005/0247038 A1 | 11/2005 | Takahashi | |
| 2006/0032203 A1 * | 2/2006 | Komori et al. | 55/523 |
| 2006/0198984 A1 * | 9/2006 | Aoki | 428/116 |
| 2006/0292333 A1 | 12/2006 | Ohno et al. | |
| 2007/0128405 A1 | 6/2007 | Sakaguchi et al. | |
| 2008/0014404 A1 | 1/2008 | Miyakawa et al. | |

FOREIGN PATENT DOCUMENTS

| | | |
|---|---|---|
| EP | 1142619 A1 | 10/2001 |
| EP | 1142619 B1 | 1/2007 |
| EP | 1604719 B1 | 7/2008 |
| GB | 1014498 | 12/1965 |
| WO | WO02/070106 A1 | 12/2002 |
| WO | WO03/051488 A1 | 6/2003 |
| WO | WO03/082773 A1 | 10/2003 |
| WO | WO2004/011124 A1 | 2/2004 |
| WO | WO2004/011386 A1 | 2/2004 |
| WO | WO2005/097706 A2 | 3/2005 |

* cited by examiner

HONEYCOMB FILTER ELEMENTS

CROSS-REFERENCE TO RELATED APPLICATION

This application claims the benefit of US Provisional Patent Application 60/927,653.

FIELD OF THE INVENTION

The present invention relates to an improved ceramic honeycomb particulate filter. In particular, the invention relates to extruding honeycomb ceramic filters that have improved strength and improved resistance to handling damage.

BACKGROUND OF THE INVENTION

Diesel engines, because of the way they operate, emit soot particles or very fine droplets of condensate or a conglomerate of the two (particulates) as well as typical harmful gasoline engine exhausts (i.e., HC and CO). These "particulates" (herein Diesel soot), are rich in condensed, polynuclear hydrocarbons, some of which may be carcinogenic.

As the awareness of the danger Diesel soot presents to health collides with the need for greater fuel efficiency that Diesel engines provide, regulations have been enacted curbing the amount of Diesel soot permitted to be emitted. To meet these challenges, soot filters have been used. The filters have had many configurations as exemplified by GB 1,014,498 and U.S. Pat. No. 4,828,807. The most common and useful filters have tended to be porous ceramic honeycombs that have plugged channels such that the exhaust gas must enter a channel and pass through the wall of the channel as exemplified by U.S. Pat. No. 4,329,162.

Ceramic honeycombs have been made from smaller segements to make larger devices such as flow through catalysts (3-way), heat regenerators and Diesel filters as exemplified by U.S. Pat. Nos. 4,304,585; 4,333,518; 4,381,815; 4,953,627; 5,914,187; 6,669,751; 6,984,253; 7,056,568 and U.S. Pat. Publ. 2006/029333.

In particular, U.S. Pat. No. 6,669,751 and U.S. Pat. Publ. 2006/029333, describe cementing, for example, filter segments of square cross-section wherein the outer corners have a straight chamfer or round corner having a radius of curvature of 0.3 mm-2.5 mm. The latter further teaches that the corner may have a straight chamfer and and round corner with the aforementioned radius of curvature. Such chamfers were described as being useful to improve strength (thermal shock resistance). However, these corners suffer from limited flexibility in wall thickness at the corner, fails to take into account of damage that may occur upon handling (i.e., still has sharp corners from chamfers, inability to adequately hard coat dies in the corners and inability to accurately reproduce the intended shape as described by U.S. patent Pub. 2006/029333, which may cause stress concentration causing edge chipping etc).

What is needed is a Diesel particulate filter that avoids one or more of the problems of the prior art such as one or more of those described above.

SUMMARY OF THE INVENTION

We have discovered an improved honeycomb soot filter that may be assembled from one or more segments that allows for the maximization of the effective filtration and minimizes damage during handling and use.

A first aspect of this invention is a ceramic honeycomb filter comprising a porous ceramic honeycomb body having an inlet end and outlet end connected by adjacent inlet and outlet channels that extend from the inlet end to the outlet end of the ceramic body, the inlet and outlet channels being defined by a plurality of interlaced thin gas filtering porous partition walls between the inlet and outlet channels and by ceramic plugs, such that the inlet channel has an inlet ceramic plug at the outlet end of the ceramic body and the outlet channel has an outlet ceramic plug at the inlet end of the ceramic body such that a fluid when entering the inlet end must pass through partition walls to exit the outlet end, wherein the ceramic honeycomb body has at least one outer corner having, a shape when viewed looking down the channels of the honeycomb, that is comprised of (i) at least two circular arcs wherein at least one of said circular arcs has a different radius of curvature than the other circular arc or arcs, (ii) a non-circular arc, or (iii) at least four straight chamfers in the absence of any arcs.

Surprisingly, in one embodiment the amount of stress may be reduced by at least 5% compared to a corner having a simple circular radius on the outer corner. The stress may even be 10%, 15% or 20% lower. Likewise, in a desirable embodiment, the inner corner opposite the outer corner above may have the same shape or different shape as the outer corner shapes described herein (i.e., not circular). In one embodiment two adjacent corners have different shapes allowing, for example, the orientation of different segments so that the plugging of the channel ends and assembling multiple segments is facilitated. The invention also allows for greater wall thickness at the pinnacle of the corner allowing for among other things, greater resilience to survive scuffing and breakage, for example, during handling and assembly.

The filter or honeycombs may be used in any applications in which it is useful to have ceramic honeycombs, such as, particulate filters (e.g., Diesel particulate filters), heat regenerators, and flow through catalysts.

DETAILED DESCRIPTION OF THE INVENTION

Figure 1:
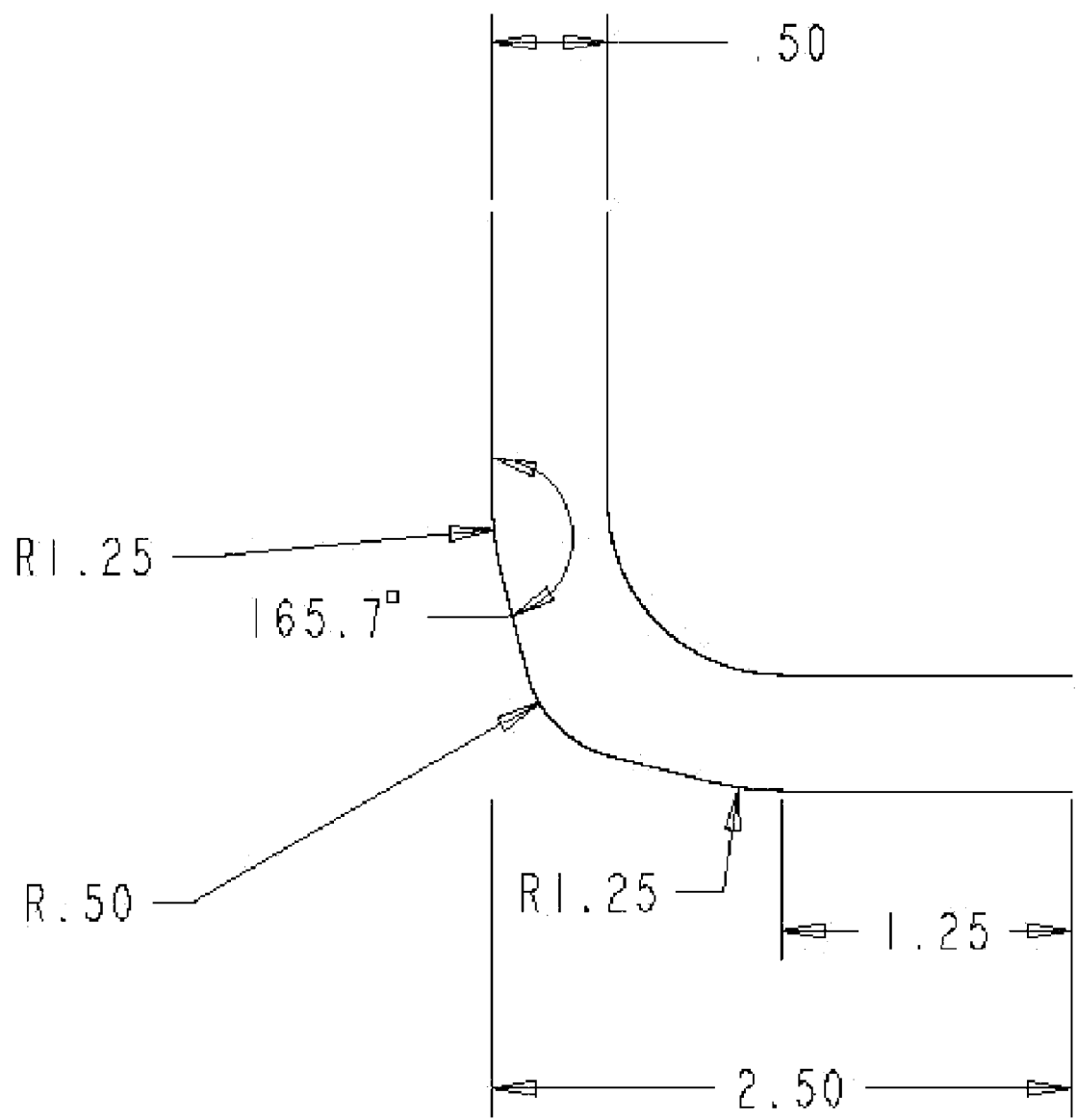
FIG. 1 is a view a corner of a ceramic honeycomb filter of this invention looking down the channel of said filter.

In practicing the invention, the porous ceramic honeycomb as well as the plugs (note, the plugs may be the same or a different ceramic than the honeycomb as well as may simply be the partition walls of the honeycomb pinched together to close off a channel) may be any suitable ceramic or combinations of ceramics such as those known in the art for filtering Diesel soot. Exemplary ceramics include alumina, zirconia, silicon carbide, silicon nitride, aluminum nitride, silicon oxynitride, silicon carbonitride, mullite, cordierite, beta spodumene, aluminum titanate, strontium aluminum silicates, lithium aluminum silicates. Preferred porous ceramic bodies include silicon carbide, cordierite and mullite or combination thereof. The silicon carbide is preferably one described in U.S. Pat. Nos. 6,582,796 and 6,669,751B1 and WO Publications EP1142619A1, WO 2002/070106A1. Other suitable porous bodies are described by WO 2004/011386A1, WO 2004/011124A1, US 2004/0020359A1 and WO 2003/051488A1.

The ceramic is preferably a ceramic having acicular grains. Examples of such acicular ceramic porous bodies include those described by WO 2005/097706 and acicular mullite as described, for example, by U.S. Pat. Nos. 5,194,154; 5,173,349; 5,198,007; 5,098,455; 5,340,516; 6,596,665 and 6,306,335; U.S. Patent Application Publication 2001/0038810; and International PCT Publication WO 03/082773.

The porous ceramic honeycomb, generally, has a porosity of about 30% to 85%. Preferably, the porous ceramic honeycomb has a porosity of at least about 40%, more preferably at least about 45%, even more preferably at least about 50%, and most preferably at least about 55% to preferably at most about 80%, more preferably at most about 75%, and most preferably at most about 70%.

The honeycomb as well as the channels may be any geometric cross-sectional shape such that it has at least one corner. Exemplary cross-sectional shapes, include, a square, rectangle, trapezoid, parallelogram, ring segment, pentagon, hexagon and octagon. The honeycomb may be any size and is dependent upon the application. The honeycombs in one embodiment may be assembled with other honeycombs (i.e., segments) to make a larger filter as is well known in the art as described in previously cited patents therefor.

The honeycomb may be formed by any suitable process such as those known in the art such as those most common being extrusion of a ceramic plastic mass comprised of ceramic particulates and extrusion additives and liquids to make the mass plastic and to bond the particulates. The extruded honeycomb is then typically dried of liquids (typically water), removal of organic additives such as lubricants, binders and surfactants by heating and further heating such that the ceramic particulates fuse or sinter together or create new particulates that subsequently fuse together. Such methods are described by numerous patents and open literature with the following merely being a small representative sample of U.S. Pat. Nos. 4,329,162; 4,741,792; 4,001,028; 4,162,285; 3,899,326; 4,786,542; 4,837,943 and 5,538,681.

The corner or corners of this invention may be formed by any suitable method, such as using known methods including, for example, (1) grinding the sintered honeycomb (i.e., machine the corner after the honeycomb has been sintered, using for example, grinding, using an abrasive grinding wheel having the form of the corner imprinted therein), (2) machining the honeycomb after any organic and/or liquid has been removed, but prior to sintering or bonding the ceramic grains in a like manner as described for grinding the sintered ceramic honeycomb, imprinting the shape after the honeycomb has been extruded, but prior to the removal of any organic or liquid , by merely pressing in a tool having the desired shape into the corner and (4) extruding the shape of the corner by machining a die having the desired shape in the corner and subsequently extruding the ceramic plastic mass through the die.

When making the shape by extruding the plastic ceramic mass through a die, the shape may be machined in the die by any suitable method, including, for example, wire electro discharge machining (wire EDM), laser machining, milling and drilling. The shape, as is well understood in the art, would be only limited on the smaller end by the reasonable practical dimensions that one can achieve by any given machining method. For example, wire EDM, which is the most common way of forming extrusion dies to make ceramic honeycombs, generally has a minimum wire diameter dimension of about 0.025 mm, but more typically the smallest size is about 0.1 mm to 0.2 mm in diameter.

Thus, for example, when a corner having a circular curvature is desired, the minimum radius, generally, is no less than about 0.15 mm when using an EDM wire of 0.2 mm, whereas the maximum circular curvature may have a radius that is many meters or more. Typically, the radius of curvature is at least about 0.05 mm to at most about 10 m, 5 m, 4 m, 3 m, 2 m, 1 m, 0.5 m, 0.1 m, 0.05 m, 0.01 m, 5 cm, 4 cm, 3 cm, 2 cm, 1 cm, 9 mm, 8 mm, 7 mm, 6 mm and 5 mm.

When making a corner that has circular curvature of radii, at least two circular arcs are present wherein at least one of the circular arcs present has a different radius of curvature than one or more of the other circular arcs present. In this aspect of the invention, the amount of circular arcs, however, typically, are less than 25, to less than 20, 15, 10, 9, 8, 7, 6, 5, or 4 circular arcs. When there are two circular arcs, there may also be one or more chamfers (i.e., straight bevel by definition) and/or one or more non-circular curvatures (i.e., arc with constant radius) wherein the total amount of such features including any non-circular arc is as described above for the circular arcs by themselves. One embodiment with two circular arcs having an equal radius of curvature and one circular arc having a different radius of curvature with two chamfers interposed there between (also referred to as tangents) is described in Example 1 below.

Similarly, when making a non-circular arc the limitations on the smallest dimension, described above, apply when making such a shape by extruding it through a die having the shape therein. A non-circular arc is any that has a changing curvature such as an arc described by a shape other than a circle, for example, parabolas, hyperbolas and ellipses. When the shape of the corner has a non-circular arc, there is, generally, at least one type of arc to generally at most about 25 arcs. The amount of non-circular arcs, however, typically, are less than 25, to less than 20, 15, 10, 9, 8, 7, 6, 5 or 4 arcs. There may also be one or more chamfers (i.e., flat bevel definition) and/or one or more circular curvatures (i.e., arc with constant radius) wherein the total amount of such features including any non-circular arc is as described above for the non-linear arcs by themselves.

When there are solely, chamfers, it is understood that at the intersections (i.e., the corners formed by the chamfers), these intersections are not atomically sharp but may be blunted by the limitations of practical machining methods as described above, for example, to make a die. When there are solely, chamfers, the amount of chamfers is at least 4, but typically there are more such as 5, 6, 7, 8, 9, 10, 15, 20 to at most about 25.

Depending on the amount of corners the honeycomb possess, but so long as there is one corner, preferably in ascending order, is at least 20%, 30%, 40%, 50%, 60%, 70%, 80%, 90% of the corners have the shape of this invention. More preferably all of the corners have the shape of this invention.

In a preferred embodiment, the corners have different shapes such that one could easily tell, for example, one face from the orientation of the corners themselves. As an illustration, a honeycomb with square cross-section, has four corners with different shape, one face can be distinguished from the other depending on the orientation of the corners. Likewise, if two adjacent corners of the same square honeycomb, are different in shape and the other two corners are the same, but different than the first mentioned corners, the face may be distinguished from each other. Such embodiments allow for the quick and easy identification, for example, of inlet faces and outlet faces when assembling honeycomb segments into a larger filter.

As is common, the partition walls may contain within the walls or coated upon the surface of the wall a catalyst. Such catalyst may be any useful to catalyze the combustion of soot, carbon monoxide and/or hydrocarbons. The catalyst preferably also abates one or more other pollutant gases in a Diesel exhaust stream such as NOx (e.g., selective catalyst reduction "SCR" to nitrogen and CO oxidized to form $CO_2$).

EXAMPLES

In all of the Examples and Comparative Example, the units shown in the Figures depicting the dimensions of the corners are in millimeters. The stresses in each of models of the stresses are von-Mises stresses in MPa.

Example 1

A honeycomb having a corner as shown in FIG. 1, which has two equal circular radii, two straight chamfers and one different circular radius, was modeled using finite element analysis using an axisymetric 45 degree model, 8 node plane strain elements under a 45 degree load of 1 N/mm of length of the honeycomb. The units in FIG. 1 are in millimeters. The material properties were chosen to reflect typical ceramic material properties, which were material modulus of 30,000 MPa and a Poisson's ratio of 0.25. The maximum stress under the applied load at the corner was 32.8 MPa and this maximum load was shifted away from the midway point of the corner at the surface of the wall in the channel.

Example 2

Figure 2:
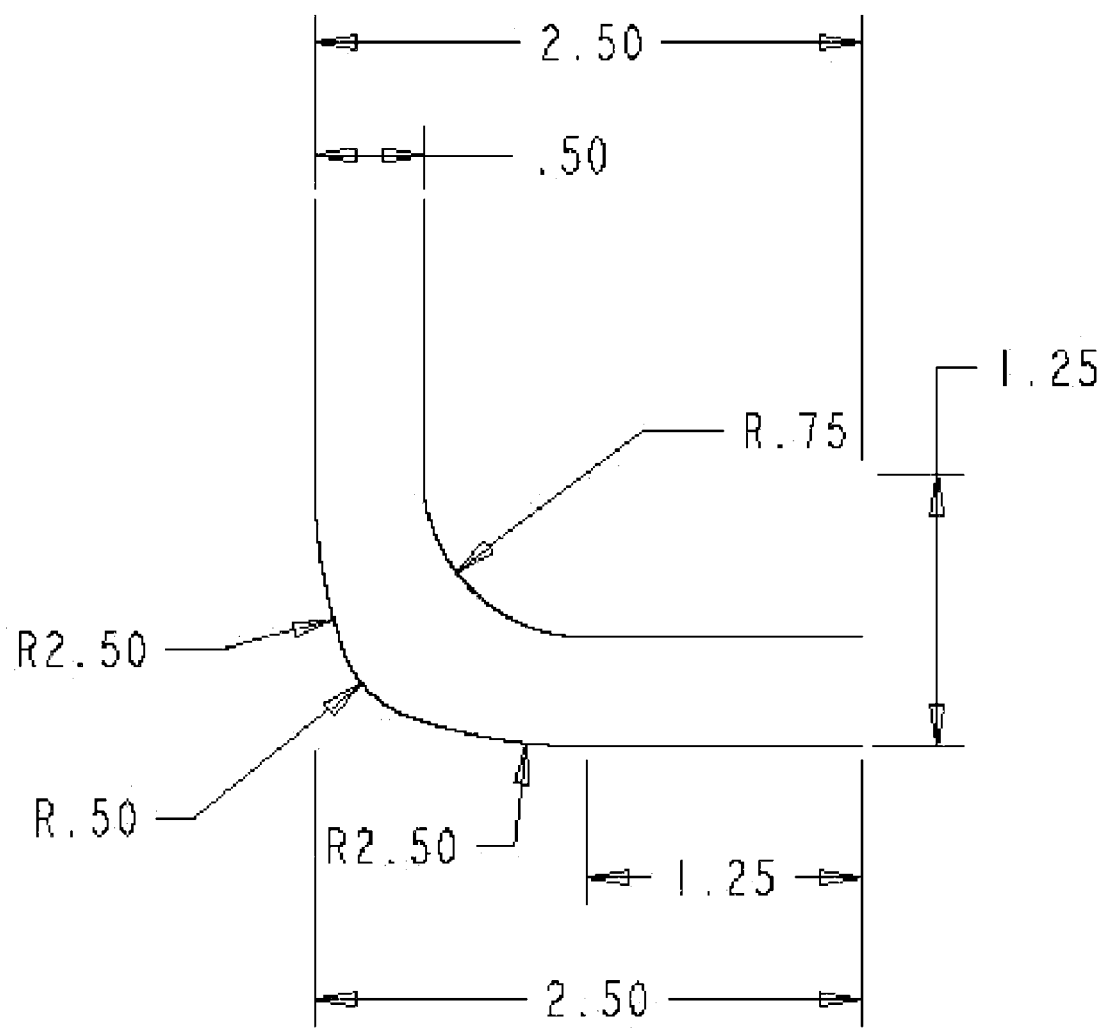
FIG. 2 is a view a corner of a ceramic honeycomb filter of this invention looking down the channel of said filter.

A honeycomb having a corner as shown in FIG. 2, which has two equal circular radii and one different circular radius, was modeled as above using the same material constants. The maximum stress under the applied load at the corner was 30.6 MPa and this maximum load was shifted from the midway point of the corner at the surface of the wall in the channel.

Comparative Example

Figure 3:
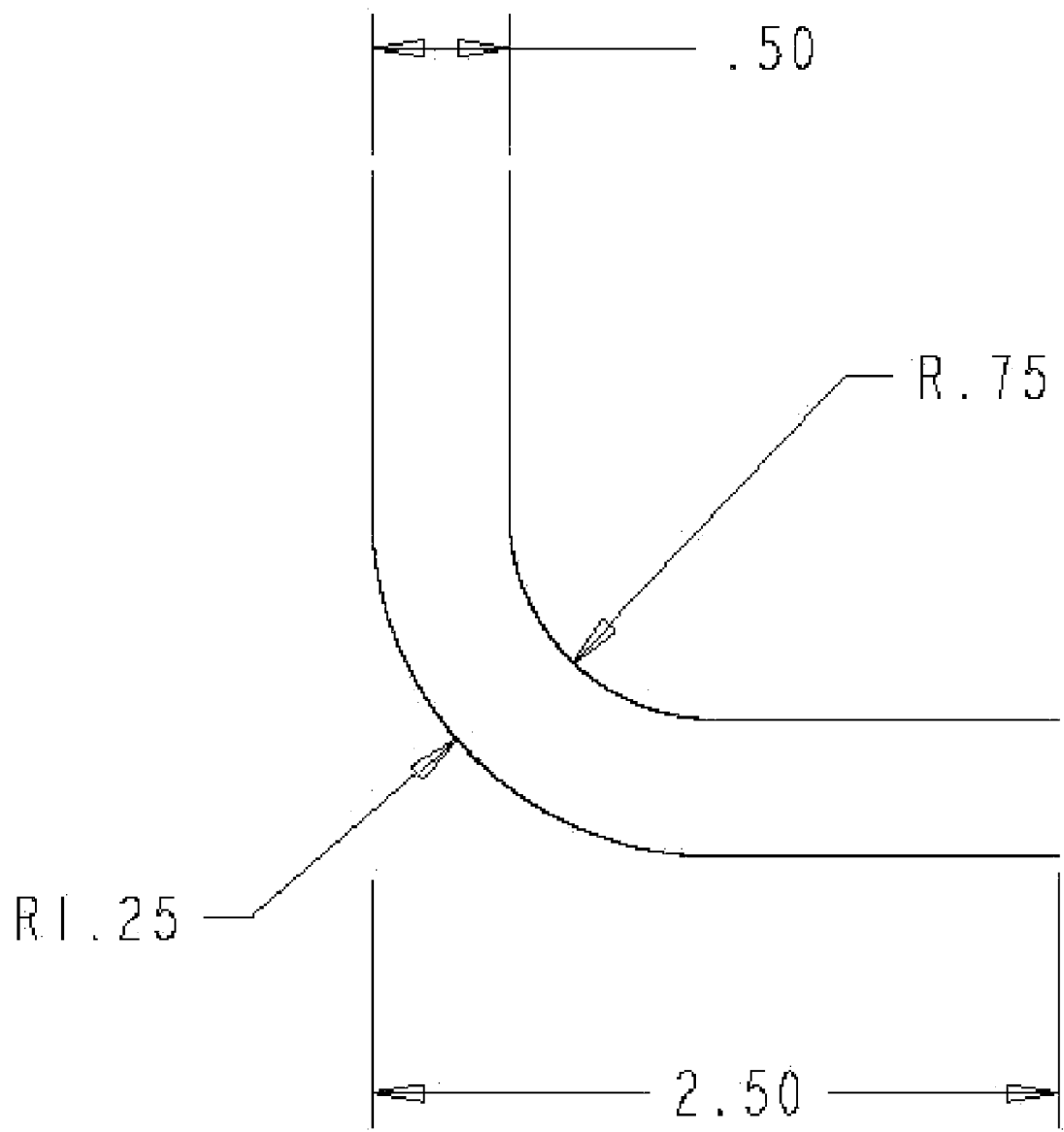
FIG. 3 is a view a corner of a ceramic honeycomb filter not of this invention looking down the channel of said filter.

The stress in the corner of a honeycomb (FIG. 3) with everything the same as in the Example 1, except that the corner had single radius of curvature of 1.25 mm, was determined in the same way as in the Example 1 using the same material constants. The maximum stress under the applied load at the corner was 37 MPa and this maximum load was at the midway point of the corner at the surface of the wall in the channel.

From the Examples and Comparative Example, the stress at the corner is reduced by the present invention substantially on the order of 10% for Example 1 and 20% for Example 2. In addition the stress is reduced even further at the halfway point of the corner for both Examples. This allows for a more thermal shock resistant and scuff resistant filter or filter segments that can be easily handled without damage.

The following Claims, even though they may not explicitly depend from one another, the invention contemplates any combination of one or more embodiments of any one claim combined with any one or more claims.

What is claimed is:

1. A ceramic honeycomb filter comprising a porous ceramic honeycomb body having an inlet end and outlet end connected by adjacent inlet and outlet channels that extend from the inlet end to the outlet end of the ceramic body, the inlet and outlet channels being defined by a plurality of interlaced thin gas filtering porous partition walls between the inlet and outlet channels and by ceramic plugs, such that the inlet channel has an inlet ceramic plug at the outlet end of the ceramic body and the outlet channel has an outlet ceramic plug at the inlet end of the ceramic body such that a fluid when entering the inlet end must pass through partition walls to exit the outlet end, wherein the ceramic honeycomb body has at least one outer corner defined by the surface on the outside of the honeycomb and an inner corner opposite the outer corner defined by the surface within a channel, the outer corner having, a shape when viewed looking down the channels of the honeycomb, that is comprised of (i) at least two circular arcs wherein at least one of said circular arcs has a different radius of curvature than the other circular arc or arcs or (ii) a non-circular arc.

2. The ceramic honeycomb filter of claim 1, wherein each of the outer corners have said shape.

3. The ceramic honeycomb filter of claim 2, wherein said outer corners have different shapes such that one could distinguish the inlet and outlet end from the orientation of the corners.

4. The ceramic honeycomb filter of claim 3, wherein each of the outer corners have a different shape.

5. The ceramic honeycomb filter of claim 1, wherein said shape is one that has at least two circular arcs wherein at least one of said circular arcs has a different radius of curvature than the other circular arc or arcs.

6. The ceramic honeycomb filter of claim 5, wherein said shape has at least 3 circular arcs.

7. The ceramic honeycomb filter of claim 6, wherein said shape has two circular arcs that have an equal radius of curvature and one circular arc that has a different radius of curvature than said circular arcs with equal radii of curvature.

8. The ceramic honeycomb filter of claim 7, wherein the circular arc with differing radius of curvature is disposed between said circular arcs with equal radii of curvature.

9. The ceramic honeycomb filter of claim 8, wherein between each of said circular arcs with equal radii and circular arc with differing radius there is a straight chamfer.

10. The ceramic honeycomb filter of claim 1, wherein said shape has at least one non-circular arc.

11. The ceramic honeycomb filter of claim 10, wherein the non-circular arc is a parabola, hyperbola or ellipse.

12. The ceramic honeycomb filter of claim 10, wherein said shape is a combination of two or more non-circular arcs.

13. The ceramic honeycomb filter of claim 12, wherein said shape consists only of non-circular arcs.

14. The ceramic honeycomb filter of claim 10, wherein said shape is comprised of at least one straight chamfer.

15. The ceramic honeycomb filter of claim 10, wherein said shape is comprised of at least one circular arc.

16. The ceramic honeycomb filter of claim 1, where in the stress in the corner is reduced by at least 5% compared to the same corner with a circular radius of curvature.

17. The ceramic honeycomb filter of claim 1, wherein the inner corner opposite the outer corner has a shape that is (i) at least two circular arcs wherein at least one of said circular arcs has a different radius of curvature than the other circular arc or arcs, (ii) a non-circular arc, or (iii) at least four straight chamfers in the absence of any arcs.

18. The ceramic honeycomb filter of claim 17, wherein the inner corner has a different shape than the shape of the outer corner opposite said inner corner.

* * * * *